Figure 1:
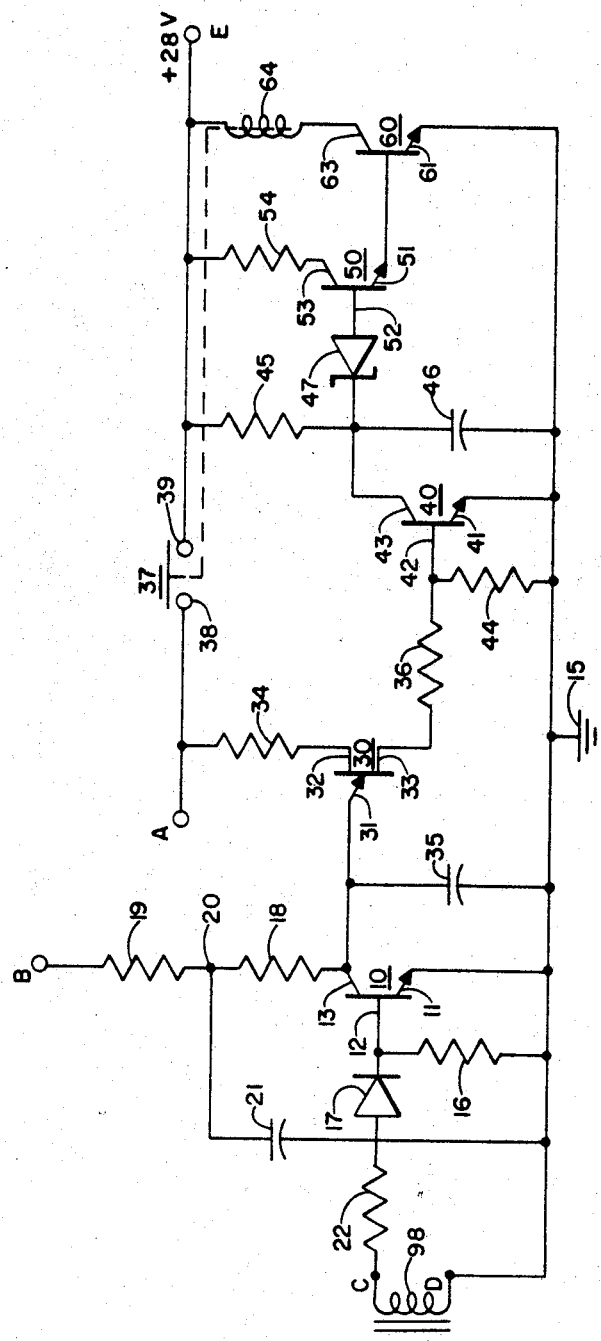

Nov. 26, 1968  L. V. WESTBROOK  3,413,521
SOLID STATE MOTOR CONTROL CIRCUIT
Filed Nov. 10, 1966  2 Sheets-Sheet 1

INVENTOR.
LOWELL V. WESTBROOK
BY
Roger W. Jensen
ATTORNEY

INVENTOR.
LOWELL V. WESTBROOK

United States Patent Office 3,413,521
Patented Nov. 26, 1968

3,413,521
SOLID STATE MOTOR CONTROL CIRCUIT
Lowell V. Westbrook, Excelsior, Minn., assignor to Honeywell Inc., Minneapolis, Minn., a corporation of Delaware
Filed Nov. 10, 1966, Ser. No. 593,566
2 Claims. (Cl. 317—13)

The present invention pertains to improvements in solid state motor control circuits. More particularly, the present invention provides an overload and failure protection circuit for use in combination with a solid state motor control circuit in which SCR bridge is constructed around the motor armature to provide the control over the direction of the motor rotation.

Silicon controlled rectifiers lend themselves to application and motor control circuits because of their fast "turn-off" and "turn-on" time plus their high current carrying capability. A very high degree of efficiency can be obtained even at high current levels. As in conventional silicon diodes, the very low forward conduction resistance due to an avalanche effect reduces the power dissipated in the SCR to a very low value. One characteristic of the SCR is that once it is turned into the conducting stage, the gate loses its control and other means must be provided to return the SCR into its non-conducting stage. This factor presents a basic control problem. To turn an SCR off, the current through it must be reduced below a certain level for a minimum period of time. This can be accomplished by discharging a capacitor across the SCR in the reverse direction.

The present invention finds a particular use in motor control circuits, wherein four SCR's are used to form a bridge around the motor armature. The direction of the motor and its speed are determined by controlling the SCR bridge. For rotation in a first direction, the first pair of SCR's are turned on; for rotation in the opposite direction a second pair of SCR's are turned on and the first pair is turned off. A commutating circuit, with a commutating SCR, is provided to control the current to the motor. By turning off the current to the motor, the commutating circuit automatically also turns off the conducting SCR's. When the commutating turns the current to the motor on, it simultaneously also turns on the appropriate pair of SCR's in the bridge.

During proper operation of the motor control circuits, the current to the motor is pulsed by the commutating circuit. If for some reason the motor control circuit loses control of the motor, the results could be undesirable.

This may happen, for example, if one of the bridge SCR's fails to turn off. To prevent damage to the motor and to minimize the motor shut down time, an overload and circuit failure protection circuit is provided by the present invention. This circuit senses whether the current to the motor is pulsed. If the current is not pulsed, a non-operating condition exists and power is interrupted. In case there is not a component failure, the power is again applied automatically and the proper motor operation is restored.

An object of the present invention is to provide an overload and a failure protection circuit for a motor control circuit.

Figure 2:
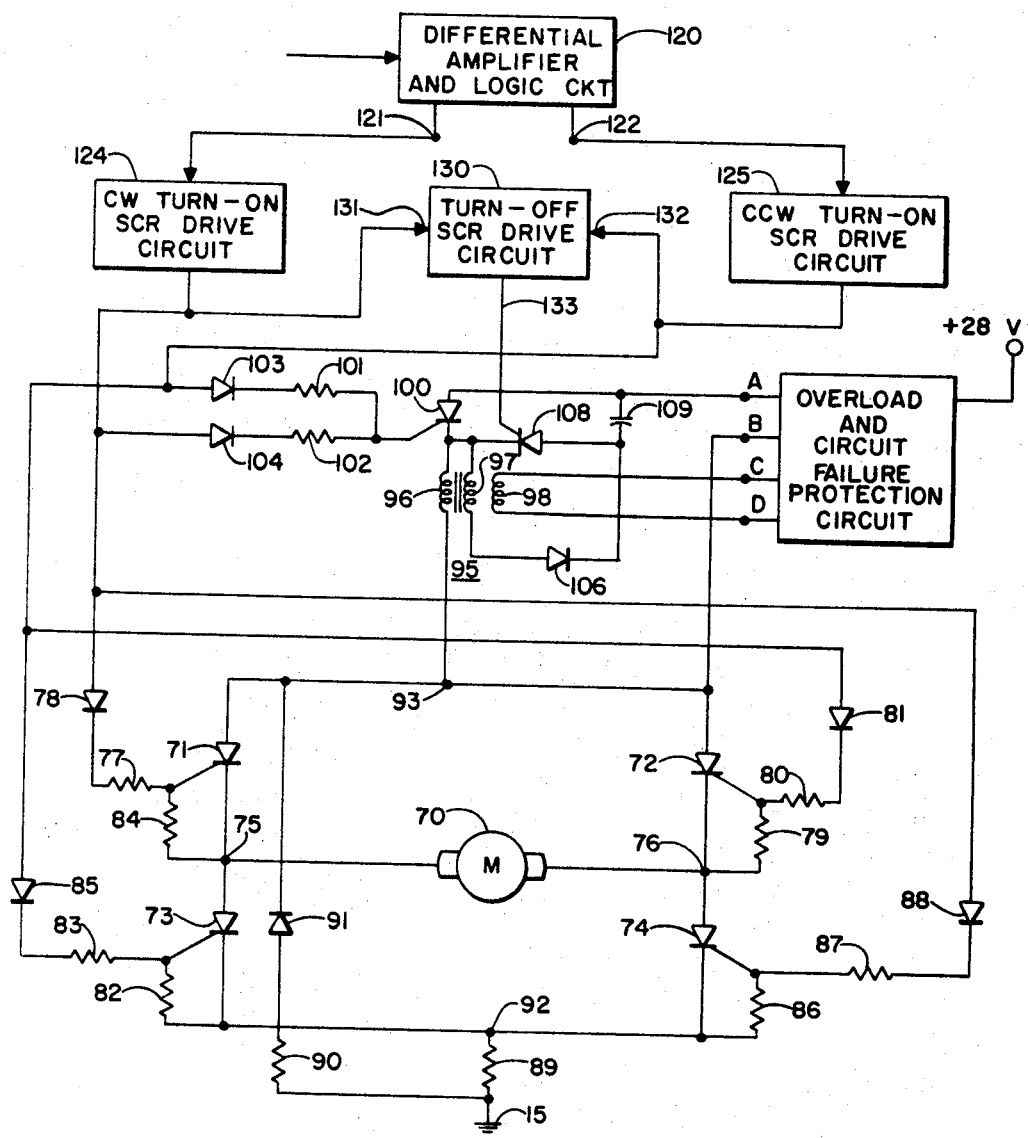

Other objects will become apparent to those skilled in the art upon consideration of the following specification, claims, and drawings in which:

FIGURE 1 is a schematic circuit diagram of the overload and circuit failure protection circuit; and FIGURE 2 is an illustration of the overall motor control circuit wherein the overload and circuit failure protection circuit of the present invention may find application.

Referring now to FIGURE 1, the overload and circuit failure protection circuit is provided with terminals A, B, C, and D for connection to a motor control circuit as illustrated in FIGURE 2, and terminal E for connection to a voltage supply source. A transistor 10 is shown with an emitter 11, a base 12, and a collector 13. Emitter 11 is connected directly to a ground potential terminal 15 and base 12 is connected to ground terminal 15 through a resistor 16 and is further connected to the cathode electrode of a diode 17. Collector 13 is connected to a junction point 20 through a resistor 18 and is also connected directly to an emitter electrode 31 of a unijunction transistor 30. A resistor 19 is connected between junction point 20 and terminal B, and a capacitor 21 is connected between junction point 20 and ground terminal 15. The anode electrode of diode 17 is connected to terminal C through a resistor 22. Terminal D is connected directly to ground potential terminal 15.

Unijunction transistor 30 further has a base 32 and a base 33. Base 32 is connected to terminal A through a resistor 34, emitter 31 is connected to ground potential terminal 15 through a capacitor 35, and base 33 is connected to base electrode 42 of a transistor 40 through a resistor 36. Transistor 40 further has an emitter electrode 41 and a collector electrode 43. A resistor 44 is connected between base electrode 42 and ground potential terminal 15. The capacitor 46 is connected between collector electrode 43 of transistor 40 and ground potential terminal 15, a resistor 45 is connected between collector 43 and a terminal 39 of a relay 37, and a Zener diode 47 is connected between collector 43 and a base electrode 52 of a transistor 50. Terminal 39 of relay 37 is connected directly to terminal E, which is connected to a source of electric potential. A relay 37 further has a second terminal 38 connected directly to terminal A.

Transistor 50 further has an emitter electrode 51 and a collector electrode 53. Collector electrode 53 is connected to terminal E through resistor 54 and emitter electrode 51 is connected directly to a base electrode 62 of a transistor 60. Transistor 60 has an emitter 61 and a collector 63. Emitter 61 is connected directly to ground potential terminal 15. Collector electrode 63 is connected to one end of a relay control winding 64. The other end of winding 64 is connected to positive potential terminal E. The function of relay control winding 64 is to close and open the electrical connection between terminals 38 and 39 of relay 37 as a function of current through transistor 60.

Referring now to FIGURE 2, there is shown a silicon control rectifier bridge comprised of silicon control rectifiers 71, 72, 73, and 74. A motor 70 is connected along one diagonal of the bridge between junction points 75 and 76. Electric power is applied across the other diagonal of the bridge between junction points 92 and 93. SCR's 71 and 72 have their anodes connected to junction point 93 and have their cathodes connected to junction points 75 and 76 respectively. SCR's 73 and 74 have their cathodes connected to junction point 92 and have their anodes connected to junction points 75 and 76 respectively. Junction point 92 is connected to ground potential terminal 15 through a resistor 89. Ground potential terminal 15 is further connected to junction point 93 through a series path of a resistor 90 and a diode 91. Diode 91 is oriented for forward current flow from ground terminal 15 to junction point 93.

A resistor 84 is connected between the gate and the cathode electrodes of SCR 71, a resistor 79 is connected between the gate and the cathode electrodes of SCR 72, a resistor 82 is connected between the gate and the cathode electrodes of SCR 73, and a resistor 86 is connected between the gate and the cathode electrodes of SCR 74.

Junction point 93 is connected to a positive potential source through a winding 96 of a transformer 95 and a SCR 100. Winding 96 is connected between junction point 93 and the cathode electrode of SCR 100. The anode electrode of SCR 100 is connected to terminal A of the overload and circuit failure protection circuit which is illustrated in detail in FIGURE 1. Transformer 95 further has additional windings 97 and 98. Winding 97 is connected between the cathode electrode of SCR 100 and the anode of a diode 106. The cathode of diode 106 is connected to the anode electrode of an SCR 108. The cathode electrode of SCR 108 is connected to the cathode electrode of SCR 100. A capacitor 109 is connected between the anode electrodes of SCR's 100 and 108. Winding 98 of transformer 95 has its ends connected between terminals C and D of overload and circuit failure protection circuit. Terminal B of the overload and circuit failure protection circuit is connected to the top of the SCR bridge at junction 93.

The speed and the direction of rotation of motor 70 is determined by the polarity of input signal to a differential amplifier and logic circuit 120. Circuit 120 has a pair of output terminals 121 and 122. Output terminal 121 is connected to an input of a clockwise turn-on SCR drive circuit 124 and output 122 of circuit 120 is connected to the input of a counter-clockwise turn-on SCR drive circuit 125.

The output of clockwise SCR drive circuit 124 is connected to the gate electrode of commutating SCR 100 through a series combination of a diode 104 and a resistor 102. The output of SCR drive circuit 124 is further connected to the gate electrode of SCR 71 of the bridge circuit through a series combination of a diode 78 and a resistor 77, and it is further connected to the gate electrode of bridge SCR 74 through a series combination of a diode 88 and a resistor 87. Diodes 104, 78, and 88, are oriented for forward current flow from the output of drive circuit 124 to the respective gate electrodes. The output of counter-clockwise turn-on SCR drive circuit 125 is connected to the gate electrode of commutating SCR 100 through a series combination of a diode 103 and a resistor 101. The output of drive circuit 125 is also connected to the gate electrode of bridge SCR 72 through a series combination of a diode 81 and a resistor 80, and is further connected to bridge SCR 73 through series combination of a diode 85 and a resistor 83. Diodes 103, 81, and 85 are oriented for forward current flow from the output of SCR drive circuit 125 to the respective gate electrodes.

The output of turn-on SCR drive circuit 124 is also connected to an input 131 of a turn-off SCR drive circuit 130. A turn-off SCR drive circuit 130 further has an input 132 and an output 133. Input 132 of circuit 130 is connected to the output of counter-clockwise turn-on SCR drive circuit 125. Output 133 of turn-off SCR drive circuit 130 is connected to the gate electrode of SCR 108.

*Operation*

For better understanding of the operation of FIGURE 1 it is beneficial to first investigate briefly the operation of FIGURE 2 and the role of the overload and circuit failure protection circuit of FIGURE 1 in the overall system of FIGURE 2.

The proper timing of the turn-on signal to the various gate electrodes of the various SCR's is provided by the control circuitry. The detailed description of the control circuitry is not given here because it is not necessary for the understanding of the present invention.

The control circuitry provides for pulse control of DC motor 70. For rotation in a clockwise direction, a first pair of SCR's 71 and 74 are turned on in conjunction with the commutating SCR 100. For rotation in the counter-clockwise direction, a second pair of SCR's 72 and 73 are turned on and the first pair is turned off. Commutating SCR 100 controls the current to the motor. By turning off the current to the motor, the commutating circuit automatically also turns off the conducting SCR's. When the commutating circuit turns the current to the motor on, it simultaneously also turns on the appropriate pair of SCR's in the bridge circuit.

An energy storing capacitor 109 is incorporated into the commutating circuit. The turn-off condition is initiated by discharging capacitor 109 across commutating SCR 100 and reducing the SCR current to a level below the holding current for the required length of time to return the SCR to its blocking state.

During normal operation of the motor control circuit, the current to the motor applied at the top of the SCR bridge is pulsed. A failure in the circuit operation, such as the failure of one of the SCR's to turn off, will interrupt the pulsating of the current and may result in damage to the motor. To safeguard against this possibility, the overload and failure protection circuit is provided by the present invention. This circuit senses the current at the top of the bridge. If the current is pulsed, normal operation exists and the protection circuit will remain inactive. If, however, the current is not pulsed, the protection circuit is activated to remove the power from the motor and to automatically reapply the power if the failure is corrected.

As shown in FIGURE 2, therminal D of the protection circuit is connected directly to the top of the SCR bridge and is maintained at the potential of junction 93. When the motor control circuit is operating properly, the potential at junction B will be pulsed, as will be the potential across winding 98 of transformer 95, between junctions C and D.

Assuming now that the circuit is operating properly, transistor 10 will be periodically turned on in response to the pulsing voltage at terminal C. While capacitor 35 will be charged by the current flowing from junction B through capacitor 35 to ground terminal 15, the capacitor will be periodically discharged through transistor 10. If, however, the operation of the circuit fails and the current at the top of the bridge is no longer pulsed, the voltage appearing at terminal B will be a steady state DC. Similarly, no positive pulses will appear at the base of transistor 10 and transistor 10 will remain continually in its nonconductive state. The positive potential at terminal B will cause a current to flow into capacitor 35 and will charge capacitor 35 to a voltage which exceeds the breakdown voltage of unijunction transistor 30. The positive potential on emitter 31 of unijunction transistor 30 will switch unijunction transistor 30. The positive potential on emitter 31 of unijunction transistor 30 will switch unijunction transistor 30 into its conductive state. This results in a positive potential at base 42 of transistor 40, causing transistor 40 to go in conduction, which in turn lowers the potential on base 52 of transistor 50, turning off normally conducting transistors 50 and 60. The turning off of transistor 60 cuts off the current flow through relay winding 64, causing relay 37 to drop out and removing the potential at terminal E from terminal A. This removes the power normally applied to the motor at the top of commutating SCR 100.

Since the defect in the control circuit causing the malfunction may be only temporary, such as the failure of one of the bridge SCR's to turn off, the defect may correct itself after temporary interruption of electric power. The present invention provides means for automatically reapplying the power after a predetermined period of time whereupon the normal operation of the motor may be restored with a minimum amount of delay. As the relay 37 is opened to remove the power from terminal A, the signal is also as a direct result removed from terminal B and C. Transistor 10, unijunction transistor 30, and transistor 40 are therefore turned off. As transistor 40 is turned off, capacitor 46 is allowed to charge with a current flowing from terminal E, through resistor 45, and into capacitor 46. When the voltage on capacitor 46 reaches a certain level, exceeding the reverse breakdown voltage of Zener diode 47, transistors 50 and 60 are turned back on and relay 37 is closed in response to the current through winding 64 and transistor 60. Electric power is thus again applied to terminal A to resume the operation of the motor. If the operation of the motor control circuit is still faulty, the entire cycle will be repeated. The recycling period is determined by the values of resistor 45, capacitor 46, and the voltage rating of Zener diode 47.

While I have shown a particular embodiment of the present invention, other modifications and improvements will become obvious to those skilled in the art. It is, therefore, understood that the specific embodiment of my invention shown here is for the purpose of illustration only, and that my invention is limited only by the scope of the appended claims.

I claim:
1. A relay control circuit comprising:
   a first terminal for connection to a source of electrical potential, a second terminal for connection to a load, and a common terminal;
   a relay having one side of a contact connected to said first terminal and having the other side of said contact connected to said second terminal, said relay further having a control means including a winding;
   means, including a semiconductor switching means, connecting said winding between said first and said common terminals;
   input means connected to said semiconductor switching means, said input means being adapted for receiving an input signal and for operating said switching means to open said relay when an input signal is present; and
   means for automatically closing said relay after a predetermined period of time, said means comprising a series combination of a resistor and a capacitor connected between said first and second terminals and a Zener diode connected between said semiconductor switching means and the junction of said capacitor and said resistor.

2. An overload and failure protection circuit for a DC motor pulse controlled by a solid state motor controller logic, said circuit comprising:
   a first terminal for connection to a source of electric potential, a second terminal for connection to said motor, and a common terminal;
   a relay having a first end of a contact connected to said first terminal and having a second end of said contact connected to said second terminal, said relay having a control means including a winding;
   semiconductor switching means having a control electrode and a pair of output electrodes, one of said output electrodes being connected to said common terminal and the other of said output electrode being connected to one end of said relay control winding;
   means connecting the other end of said relay control winding to said first terminal;
   bias means connected to said semiconductor switching means for normally maintaining said switching means conductive, thereby energizing said control winding and maintaining said relay closed;
   pulse detecting means connected to said motor controller logic for sensing the current through said motor and providing an output signal when said current to the motor is not pulsed;
   means connecting the output of said pulse detecting means to said semiconductor switching means for turning said switching means into its nonconductive state when the current to the motor is not pulsed, thereby opening said relay and removing the power from the motor; and
   further means for automatically closing the relay after a predetermined period of time, said further means including a series combination of a capacitor and resistor connected between said first and common terminals and a Zener diode connected between the control electrode of said semiconductor switching means and the junction of said capacitor and said resistor.

References Cited

UNITED STATES PATENTS

| 2,924,724 | 2/1960 | Booker. | |
| 3,133,230 | 5/1964 | Glassburn | 317—36 |
| 3,325,718 | 6/1967 | McNulty | 317—33 X |
| 3,365,675 | 1/1968 | Gaddy et al. | 317—33 X |

JOHN F. COUCH, *Primary Examiner.*

J. D. TRAMMELL, *Assistant Examiner.*